United States Patent
Kolavennu et al.

(10) Patent No.: US 10,271,284 B2
(45) Date of Patent: *Apr. 23, 2019

(54) METHODS AND SYSTEMS FOR PERFORMING GEOFENCING WITH REDUCED POWER CONSUMPTION

(71) Applicant: Ademco Inc., Golden Valley, MN (US)

(72) Inventors: Soumitri Kolavennu, Blaine, MN (US); Kevin L. Weirich, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,575

(22) Filed: Mar. 7, 2017

(65) Prior Publication Data

US 2017/0181100 A1    Jun. 22, 2017

Related U.S. Application Data

(63) Continuation of application No. 14/938,595, filed on Nov. 11, 2015, now Pat. No. 9,628,951.

(51) Int. Cl.
*H04W 24/00* (2009.01)
*H04W 52/02* (2009.01)
(Continued)

(52) U.S. Cl.
CPC ....... *H04W 52/0274* (2013.01); *H04W 4/021* (2013.01); *H04W 4/023* (2013.01)

(58) Field of Classification Search
CPC .. H04W 4/021; H04W 4/023; H04W 52/0274
(Continued)

(56) References Cited

U.S. PATENT DOCUMENTS 5,317,670 A    5/1994  Elia
6,255,988 B1   7/2001  Bischoff
(Continued)

FOREIGN PATENT DOCUMENTS

AU   2015201441 A1   10/2015
CN    101689327 B    5/2013
(Continued)

OTHER PUBLICATIONS

The Extended European Search Report for EP Application No. 16195639.6, dated May 31, 2017.
(Continued)

*Primary Examiner* — Timothy Pham
(74) *Attorney, Agent, or Firm* — Seager Tufte & Wickhem LLP

(57) ABSTRACT

A GPS capability of a mobile device may be turned on in order to ascertain an updated current location and then be turned off. Position relative to the geofence may be determined based on the updated current location and a time to fence value that provides an estimate of how soon an individual carrying the mobile device could cross the geofence may be calculated. The GPS capability may be kept turned off for a delay time period that is based at least in part on the calculated time to fence value. After the delay time period, the GPS capability of the mobile device may be turned back on and the cycle of turning on the GPS, ascertaining an updated current location and turning off the GPS may continue. An indication of the position of the mobile device relative to the geofence may be transmitted.

20 Claims, 8 Drawing Sheets

(51) Int. Cl.
*H04W 4/021* (2018.01)
*H04W 4/02* (2018.01)

(58) Field of Classification Search
USPC .................................................... 455/456.1
See application file for complete search history.

(56) References Cited

U.S. PATENT DOCUMENTS

| | | | |
|---|---|---|---|
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,343,226 B2 | 3/2008 | Ehlers et al. |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,574,208 B2 | 8/2009 | Hanson et al. |
| 7,614,567 B2 | 11/2009 | Chapman, Jr. et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,904,608 B2 | 3/2011 | Price |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,150,421 B2 | 4/2012 | Ward et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,219,114 B2 | 7/2012 | Larsen |
| 8,229,722 B2 | 7/2012 | Nasle |
| 8,229,772 B2 | 7/2012 | Tran et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,305,935 B2 | 11/2012 | Wang |
| 8,315,717 B2 | 11/2012 | Forbes, Jr. et al. |
| 8,332,055 B2 | 12/2012 | Veillette |
| 8,334,906 B2 | 12/2012 | Lipton et al. |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,406,162 B2 | 3/2013 | Haupt et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,510,241 B2 | 8/2013 | Seshan |
| 8,510,255 B2 | 8/2013 | Fadell et al. |
| 8,531,294 B2 | 9/2013 | Slavin et al. |
| 8,554,374 B2 | 10/2013 | Luncek et al. |
| 8,554,714 B2 | 10/2013 | Raymond et al. |
| 8,556,188 B2 | 10/2013 | Steinberg |
| 8,560,127 B2 | 10/2013 | Leen et al. |
| 8,571,518 B2 | 10/2013 | Imes et al. |
| 8,577,392 B1 | 11/2013 | Pai et al. |
| 8,587,445 B2 | 11/2013 | Rockwell |
| 8,606,374 B2 | 12/2013 | Fadell et al. |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,666,558 B2 | 3/2014 | Wang et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,725,831 B2 | 5/2014 | Barbeau et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,868,254 B2 | 10/2014 | Louboutin |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,292,022 B2 | 3/2016 | Ramachandran et al. |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,396,344 B2 | 7/2016 | Jones |
| 9,414,422 B2 | 8/2016 | Belghoul et al. |
| 9,432,807 B2 | 8/2016 | Kern, Jr. et al. |
| 9,433,681 B2 | 9/2016 | Constein et al. |
| 9,449,491 B2 | 9/2016 | Sager et al. |
| 9,477,239 B2 | 10/2016 | Bergman et al. |
| 9,491,577 B1 | 11/2016 | Jones |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,609,478 B2 | 3/2017 | Frenz et al. |
| 9,618,227 B2 | 4/2017 | Drew |
| 9,628,951 B1 | 4/2017 | Kolavennu et al. |
| 9,635,500 B1 | 4/2017 | Becker et al. |
| 9,645,589 B2 | 5/2017 | Leen et al. |

(56) References Cited

U.S. PATENT DOCUMENTS

| | | |
|---|---|---|
| 2002/0147006 A1 | 10/2002 | Coon et al. |
| 2004/0034484 A1 | 2/2004 | Solomita, Jr. et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0043478 A1 | 2/2007 | Ehlers et al. |
| 2007/0060171 A1 | 3/2007 | Sudit et al. |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2008/0262820 A1 | 10/2008 | Nasle |
| 2009/0012704 A1 | 1/2009 | Franco et al. |
| 2009/0187499 A1 | 7/2009 | Mulder et al. |
| 2009/0240381 A1 | 9/2009 | Lane |
| 2009/0302994 A1 | 12/2009 | Rhee et al. |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2011/0214060 A1 | 9/2011 | Imes et al. |
| 2012/0065802 A1 | 3/2012 | Seeber et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1 | 3/2013 | Knapton et al. |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0267253 A1 | 10/2013 | Case et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0100835 A1 | 4/2014 | Majumdar et al. |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0330435 A1 | 11/2014 | Stoner et al. |
| 2014/0337123 A1 | 11/2014 | Nuernberg et al. |
| 2014/0349672 A1 | 11/2014 | Kern, Jr. et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0140994 A1 | 5/2015 | Partheesh et al. |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1 | 7/2015 | Patton et al. |
| 2015/0237470 A1 | 8/2015 | Mayor et al. |
| 2015/0271638 A1 | 9/2015 | Menayas et al. |
| 2015/0301543 A1 | 10/2015 | Janoso et al. |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0018122 A1 | 1/2016 | Frank et al. |
| 2016/0018832 A1 | 1/2016 | Frank et al. |
| 2016/0054865 A1 | 2/2016 | Kerr et al. |
| 2016/0057572 A1 | 2/2016 | Bojorquez Alfaro et al. |
| 2016/0142872 A1 | 5/2016 | Nicholson et al. |
| 2016/0223998 A1 | 8/2016 | Songkakul et al. |
| 2016/0261424 A1 | 9/2016 | Gamberini |
| 2016/0286033 A1 | 9/2016 | Frenz et al. |
| 2016/0313749 A1 | 10/2016 | Frenz |
| 2016/0313750 A1 | 10/2016 | Frenz et al. |
| 2017/0026506 A1 | 1/2017 | Haepp et al. |
| 2017/0130979 A1 | 5/2017 | Kolavennu et al. |
| 2017/0134214 A1 | 5/2017 | Sethuraman et al. |
| 2017/0171704 A1 | 6/2017 | Frenz |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 A1 | 3/2005 |
| EP | 2607802 | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 A | 9/2012 |
| WO | 2006055334 A1 | 5/2006 |
| WO | 2009034720 A1 | 3/2009 |
| WO | 2009036764 A2 | 3/2009 |
| WO | 2009067251 A1 | 5/2009 |
| WO | 2011011404 A1 | 1/2011 |
| WO | 2011121299 A1 | 10/2011 |
| WO | 2012000107 A1 | 1/2012 |
| WO | 2012068517 A1 | 5/2012 |
| WO | 2013170791 A1 | 11/2013 |
| WO | 2014016705 A2 | 1/2014 |
| WO | 2014047501 A1 | 3/2014 |
| WO | 2014055939 A1 | 4/2014 |
| WO | 2014144323 A1 | 9/2014 |
| WO | 2014197320 A1 | 12/2014 |
| WO | 2014200524 A2 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

The Extended European Search Report for EP Application No. 16156760.7-1862, dated Jul. 8, 2016.

The Extended European Search Report for EP Application No. 16196128.9 dated Mar. 7, 2017.

Gentec, "Feature Focus, Threat Level Management," 2 pages, 2013.

Allure Energy, "Our Technology," http://www.allure-energy.com/pages/about.jsp 1 page, printed May 30, 2012.

The International Search Report for PCT Application No. PCT/US2010/042589 dated Nov. 22, 2010.

Mozer, "The Neural Network House: An Environment that Adapts to Its Inhabitants," Department of Computer Science, University of Colorado, 5 pages, downloaded May 29, 2012.

Scanlon et al., "Mutual Information Based Visual Feature Selection for Lipreading," 8th International Conference on Spoken Language Processing, 5 pages, Oct. 4-8, 2004.

Transportation Research Board of the National Academies, "Commuting in America III, the Third National Report on Commuting Patterns and Trends," 199 pages, 2006.

Balaji et al., "Sentinel: Occupancy Based HVAC Actuation Using Existing WiFi Infrastructure Within Commercial Buildings," SenSys '13, 14 pages, Nov. 11-15, 2015.

"Petition for Inter Partes Review of U.S. Pat. No. 8,571,518 Pursuant to 35 U.S.C. 311-319, 37 CFR 42," Inventor Imes et al., dated Oct. 29, 2014.

The Extended European Search Report for EP Application No. 1619416, dated Feb. 2, 2017.

U.S. Appl. No. 15/048,902, filed Feb. 19, 2016.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

(56) References Cited

OTHER PUBLICATIONS

Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20 +) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://lWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.

METHODS AND SYSTEMS FOR PERFORMING GEOFENCING WITH REDUCED POWER CONSUMPTION

This is a continuation application of co-pending U.S. patent application Ser. No. 14/938,595, filed Nov. 11, 2015, and entitled "METHODS AND SYSTEMS FOR PERFORMING GEOFENCING WITH REDUCED POWER CONSUMPTION", which is incorporated herein by reference.

TECHNICAL FIELD

The disclosure relates generally to geofencing, and more particularly to methods and systems for achieving geofencing with reduced power consumption.

BACKGROUND

A geofence typically represents a virtual perimeter around a real-world geographic area, and the process of using a geofence is often called geofencing. A geofence may be a radius or the like around a building or other set location, or can be a predefined set of boundaries like school attendance zones or neighborhood boundaries. Geofencing can be used to identify when a tracked object crosses into or out of a defined geofence. In some cases, the location of the tracked object may be determined using location services of a mobile device, such as a smartphone or other mobile device. In some cases, the location services may include a cellular triangulation capability and/or a GPS capability. Some example geofence application may include notifying parents if their child leaves a designated area, tracking when vehicles, employees, or other assets enter or leave a designated area, enabling or disabling certain geofence enabled equipment when the equipment enters or leaves a designated area, etc.

Geofencing may also be used in conjunction with building automation systems. Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. In one example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to an armed or away state when in an unoccupied mode and an unarmed or home state when in an occupied mode. It is contemplated that geofencing may be used to inform the building automation system as to when the building is expected to be occupied and unoccupied, and the building automation system may respond accordingly.

SUMMARY

The present disclosure pertains generally to geofencing, and in some cases, to building automation systems with geofencing capabilities. An example of the disclosure may be found in a method of implementing geofencing using a mobile device having a GPS capability and being configured to be operably coupled to a building controller. A geofence defining a region about a building may be set. The GPS capability of the mobile device may be turned on in order to ascertain an updated current location of the mobile device, and then be turned off to save power at the mobile device. A position of the mobile device relative to the geofence may be determined based on the updated current location and a time to fence value that provides an estimate of how soon an individual carrying the mobile device could cross the geofence may be calculated. The GPS capability may be kept turned off for a delay time period that is based at least in part on the calculated time to fence value. After the delay time period, the GPS capability of the mobile device may be turned back on and the cycle of turning on the GPS, ascertaining an updated current location and turning off the GPS may be repeated. An indication of the position of the mobile device relative to the geofence may be transmitted.

Another example of the disclosure may be found in a mobile device having GPS. The mobile device may include a user interface, a memory and a controller that is operably coupled to the user interface and to the memory. The memory may store an executable program as well as information pertaining to a geofence assigned to a building. The controller may be configured to temporarily turn on the GPS in order to determine an updated current location of the mobile device, and then turn the GPS off. The controller may compare the updated current location of the mobile device to the geofence and calculate a time to fence value that indicates a minimum time in which the mobile device could cross the geofence. The controller may wait a delay time period that is based at least in part on the calculated time to fence value before temporarily turning the GPS on again to determine an updated current location of the mobile device, and then turn the GPS off. The controller may cause the mobile device to transmit an indication of the updated current location of the mobile device relative to the geofence.

Another example of the disclosure may be found in a mobile device having location services including a cellular triangulation capability and a GPS capability. The mobile device may include a user interface, a memory and a controller that is operably coupled to the user interface and to the memory. The memory may store an executable program as well as information pertaining to a geofence assigned to a building. The controller may be configured to turn on at least some of the location services in order to determine an updated current location of the mobile device. The controller may compare the updated current location to the geofence and calculate a time to fence value that indicates a minimum time in which the mobile device could cross the geofence and may then wait a delay time period that is based at least in part on the calculated time to fence value before turning on the location services on again, and then turn off the location services. The controller may cause the mobile device to transmit an indication of the updated current location of the mobile device relative to the geofence.

While these examples relate to an illustrative geofence application for a building, it is contemplated that the principles disclosed herein can be used in any suitable geofence application including, but not limited to, notifying parents if their child leaves a designated area, tracking when vehicles, employees, or other assets enter or leave a designated area, enabling or disabling certain geofence enabled equipment when the equipment enters or leaves a designated area, etc.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
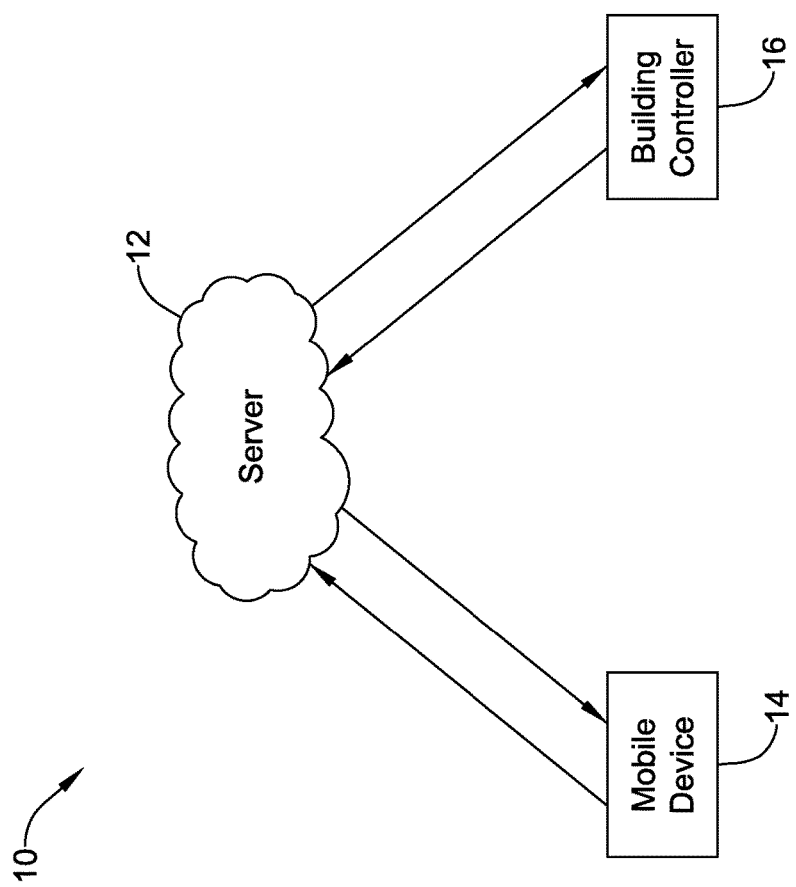
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
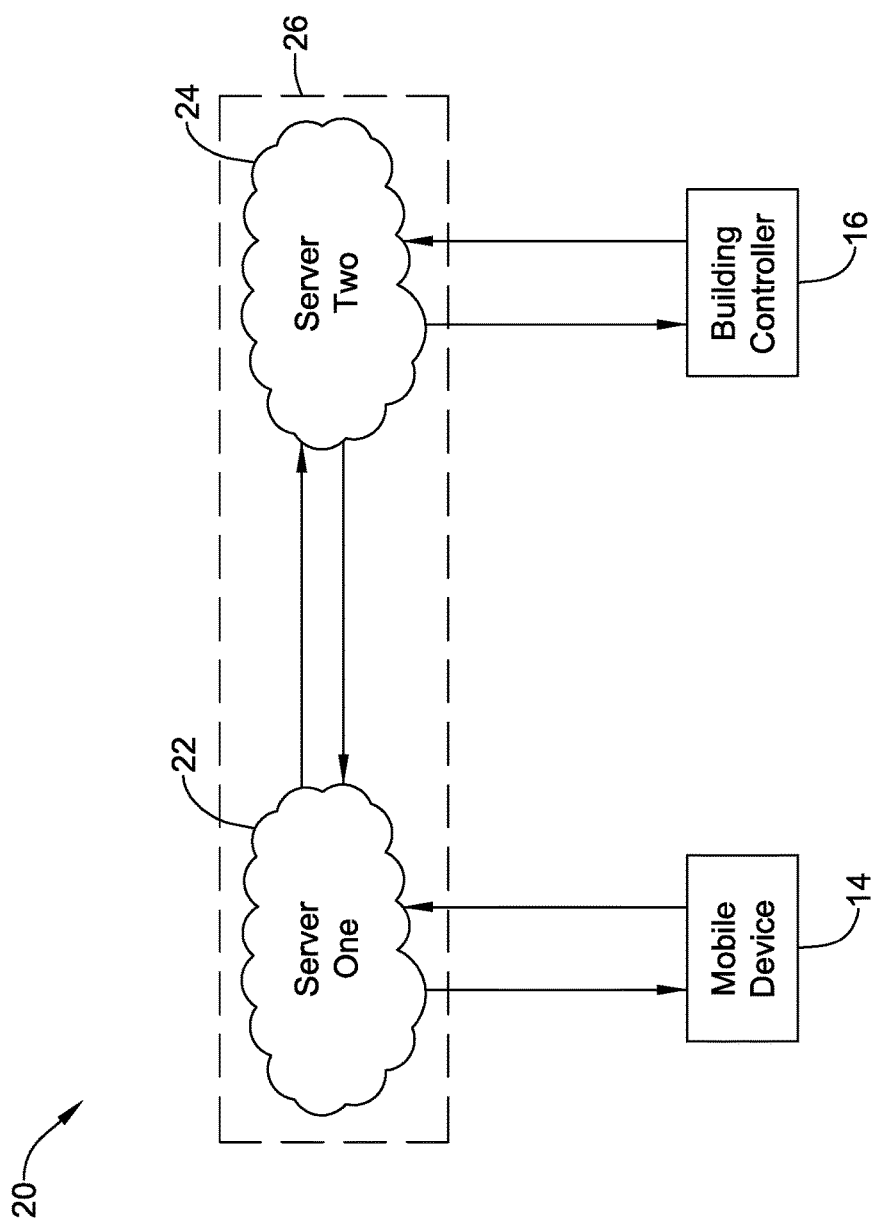
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
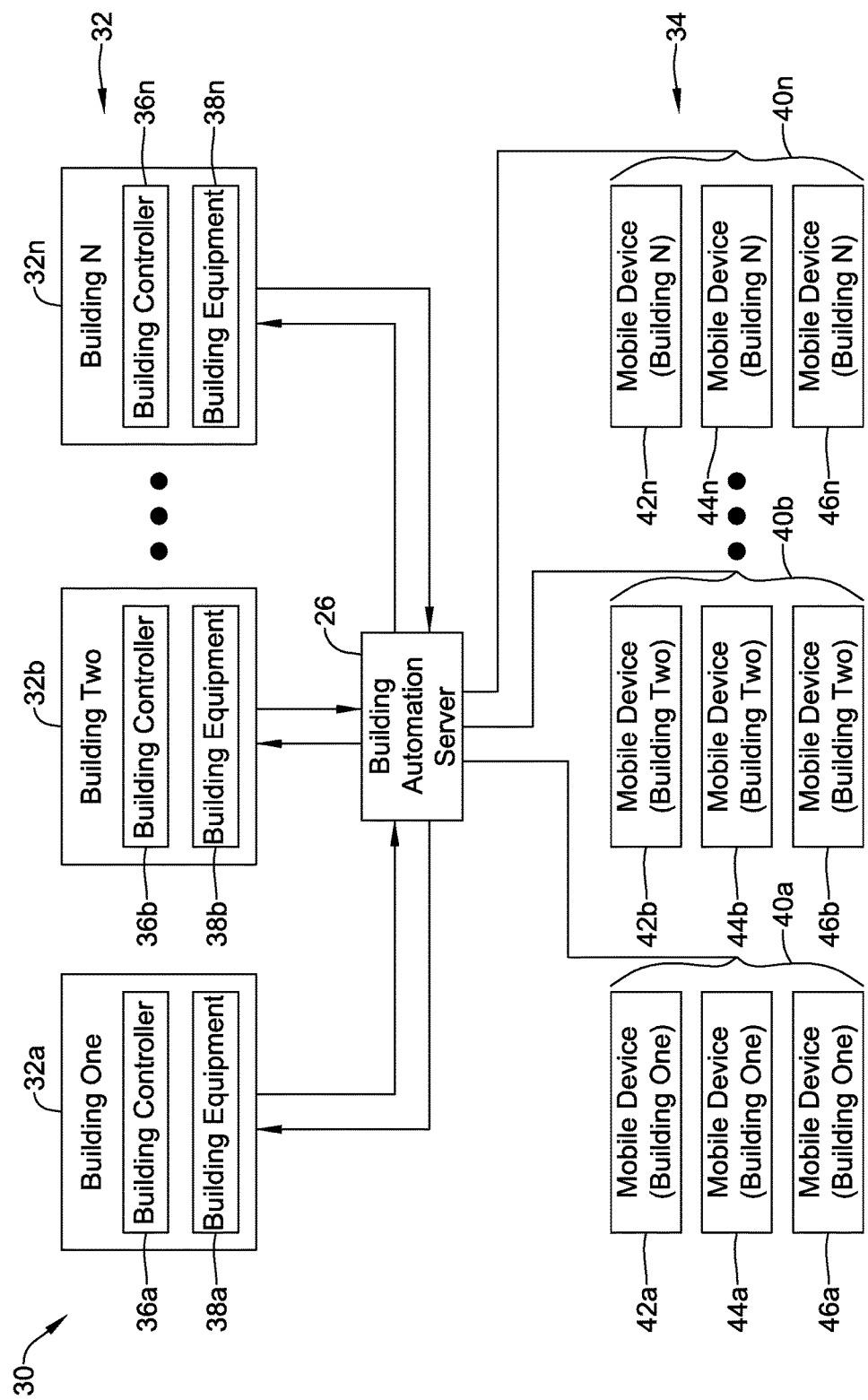
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smart phones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geofence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

The mobile device need not be a smart phone or tablet. Instead, the mobile device may be any GPS enabled tag or module that can be fixed to a person (e.g. building occupant, child, employee) or thing (e.g. car, truck, other equipment). Moreover, while much of the present disclosure relates to an illustrative geofence application for a building, it is contemplated that the principles disclosed herein can be used in any suitable geofence application including, but not limited to, notifying parents if their child leaves a designated area, tracking when vehicles, employees, or other assets enter or leave a designated area, enabling or disabling certain geofence enabled equipment when the equipment enters or leaves a designated area, etc.

Figure 4:
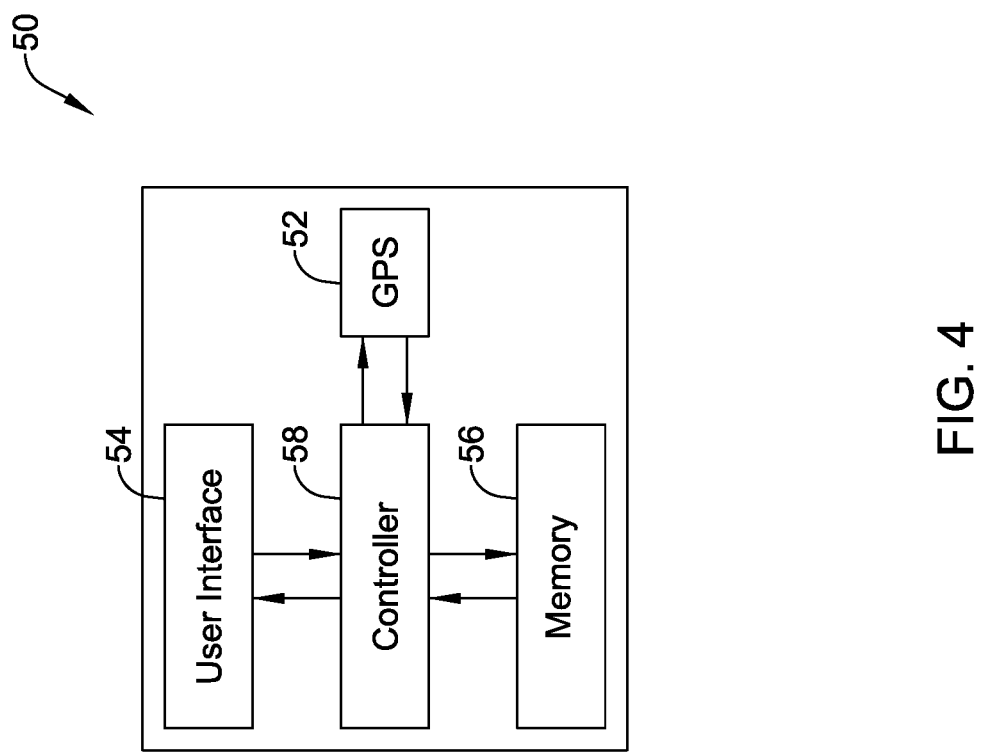
FIG. 4 is a schematic view of an illustrative mobile device.

FIG. 4 is a schematic illustration of an illustrative mobile device 50 having GPS capability, schematically illustrated as GPS 52. In some instances, the mobile device 50 may be considered as being an example of the mobile device 14 shown in FIGS. 1 and 2. The mobile device 50 has a user interface 54, a memory 56 and a controller 58 that is operably coupled to the user interface 54 and to the memory 56. The controller 58 may be considered as being operably coupled with the GPS 52 as well. The memory 56 may be configured to store an executable program as well as information pertaining to a geofence that is assigned to a building. The controller 58 may be configured to temporarily turn on the GPS 52 in order to determine an updated current location of the mobile device 50 prior to turning the GPS 52 back off in order to reduce power consumption.

In some cases, the controller 58 may be configured to compare the updated current location of the mobile device 50 to the geofence and calculate a time to fence value that indicates a minimum time in which the mobile device 50 could cross the geofence. The time to fence value may be calculated in any of a variety of manners. In some instances, the controller 58 may calculate the time to fence value by estimating how soon an individual carrying the mobile device 50 could cross the geofence when leaving the building. The controller 58 may calculate the time to fence value by estimating how soon an individual carrying the mobile device 50 could cross the geofence when returning to the building.

The controller 58 may, for example, calculate the time to fence value by determining a straight line distance between the updated current location of the mobile device 50 and the building and subtracting a radius of the geofence, and determining the time to fence value based on a predetermined maximum speed that the user carrying the mobile device 50 may travel (e.g. 80 mph). In some instances, the controller 58 may calculate the time to fence value by determining a driving route between the updated current location of the mobile device 50 and a point on the geofence along the driving route, and determining the time to fence value based on the driving route. In some cases, the time to fence value calculations may take current traffic and/or road conditions into account, and in some cases, speed limits along the driving route. In some instances, the controller 58 may be configured to wait a delay time period that is based at least in part on the calculated time to fence value before temporarily turning the GPS 52 on again to determine an updated current location of the mobile device 50, and then turn the GPS 52 off. In some cases, the delay time period is linear with the calculated time to fence value, and represents a particular fraction or percent thereof. For example, in some cases the delay time period may be about 80 percent of the calculated time to fence value, or perhaps about 90 percent of the calculated time to fence value. In some cases, the delay time period may be non-linear with the calculated time to fence value. For example, the delay time period may be the calculated time to fence value less a predetermined time. In some cases, the delay time period may, for example, be ten minutes less than the calculated time to fence value is one hour or less. The delay time period may be five minutes less than the calculated time to fence value if the calculated time to fence value is more than one hour. These numerical examples are merely illustrative.

In some cases, the controller 58 may be configured to calculate a horizontal dilution of precision (HDOP) value for the current location indicated by the GPS 52. The HDOP provides an indication of the accuracy of the current GPS reading. For example, if the GPS 52 has locked onto many GPS satellites, the HDOP may be higher (more accuracy) than if the GPS 52 has only locked onto a few GPS satellites. In another example, the GPS 52 may have a lower HDOP (less accuracy) if the GPS 52 is inside of a building than of the GPS 52 were outside.

In some cases, if the HDOP of the current GPS reading is not very high (lower accuracy), the controller 58 may keep the GPS 52 turned on during the delay time period. If the HDOP improves to a level at or above a predetermined HDOP accuracy threshold, the controller 58 may turn the GPS 52 off during the next delay time period. If the HDOP does not improve, or does not improve sufficiently to reach the predetermined HDOP accuracy threshold, the controller 58 may make the determination that the mobile device 50 is currently in a region with poor GPS service.

In some cases, if the mobile device 50 is determined to be in a region with poor GPS service, the delay time period may be shortened relative to the calculated time to fence value. Conversely, if the HDOP indicates that the mobile device 50 is in a region with good GPS service, the delay time period may be lengthened relative to the calculated time to fence value in order to further conserve energy at the mobile device 50.

In some cases, the controller 58 may be configured to cause the mobile device 50 to transmit an indication of the updated current location of the mobile device 50 relative to the geofence. In some cases, the controller 58 may be configured to cause the mobile device 50 to transmit an indication of the updated current location of the mobile device 50 relative to the geofence each time the location is checked and/or changed. In some instances, the controller 58 may be configured to cause the mobile device 50 to transmit the indication of the updated current location of the mobile device 50 relative to the geofence when the updated current location of the mobile device 50 indicates a geofence crossing.

Figure 5:
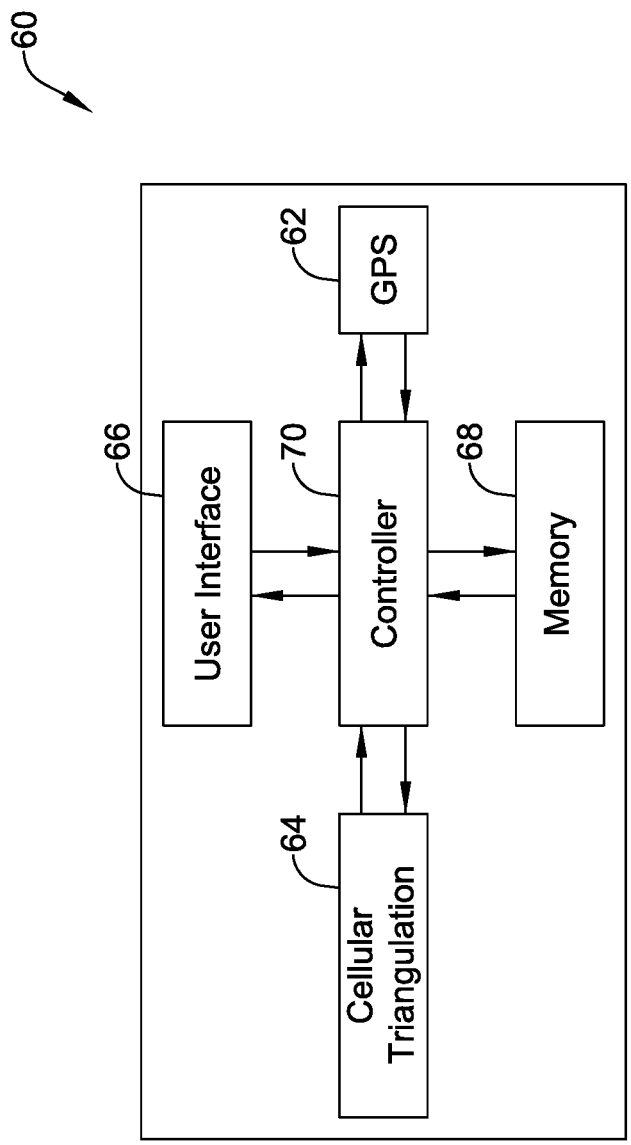
FIG. 5 is a schematic view of another illustrative mobile device.

FIG. 5 is a schematic illustration of an illustrative mobile device 60 having location services including GPS capability, schematically illustrated as GPS 62, and cellular triangulation capability, schematically illustrated as cellular triangulation 64. In some instances, the mobile device 60 may be considered as being an example of the mobile device 14 shown in FIGS. 1 and 2. The illustrative mobile device 60 has a user interface 66, a memory 68, and a controller 70 that is operably coupled to the user interface 66 and to the memory 68. The controller 70 may be considered as being operably coupled with the GPS 62 and the cellular triangulation 64. The memory 68 may be configured to store an executable program as well as information pertaining to a geofence that is assigned to a building. The controller 70 may be configured to temporarily turn on at least some of the location services in order to determine an updated current location of the mobile device 60.

The controller 70 may compare the updated current location to the geofence stored in the memory 68 and calculate a time to fence value that indicates a minimum time in which the mobile device 60 could cross the geofence. In some cases, the controller 70 may wait a delay time period that is based at least in part on the calculated time to fence value before turning on the location services on again, and then turn off the location services. In some instances, the controller 58 may turn on the cellular triangulation 64 and not the GPS 62 if the calculated time to fence value is greater than a predetermined value and may turn on the GPS 62 if the calculated time to fence value is less than the predetermined value. Typically, cellular triangulation 64 has less accuracy than GPS 62, but also consumes far less power. As such, when the calculated time to fence value is greater than the predetermined value, and the updated current location is relatively further from the geofence, the less accurate cellular triangulation 64 may be sufficient to calculate the updated current location. When the calculated time to fence value is less than the predetermined value, and the updated current location is relatively closer to the geofence, it may be desirable to use the more accurate GPS 62 to calculate the updated current location. In some instances, the controller 70 may be configured to cause the mobile device 60 to transmit an indication of the updated current location of the mobile device relative to the geofence.

Figure 6:
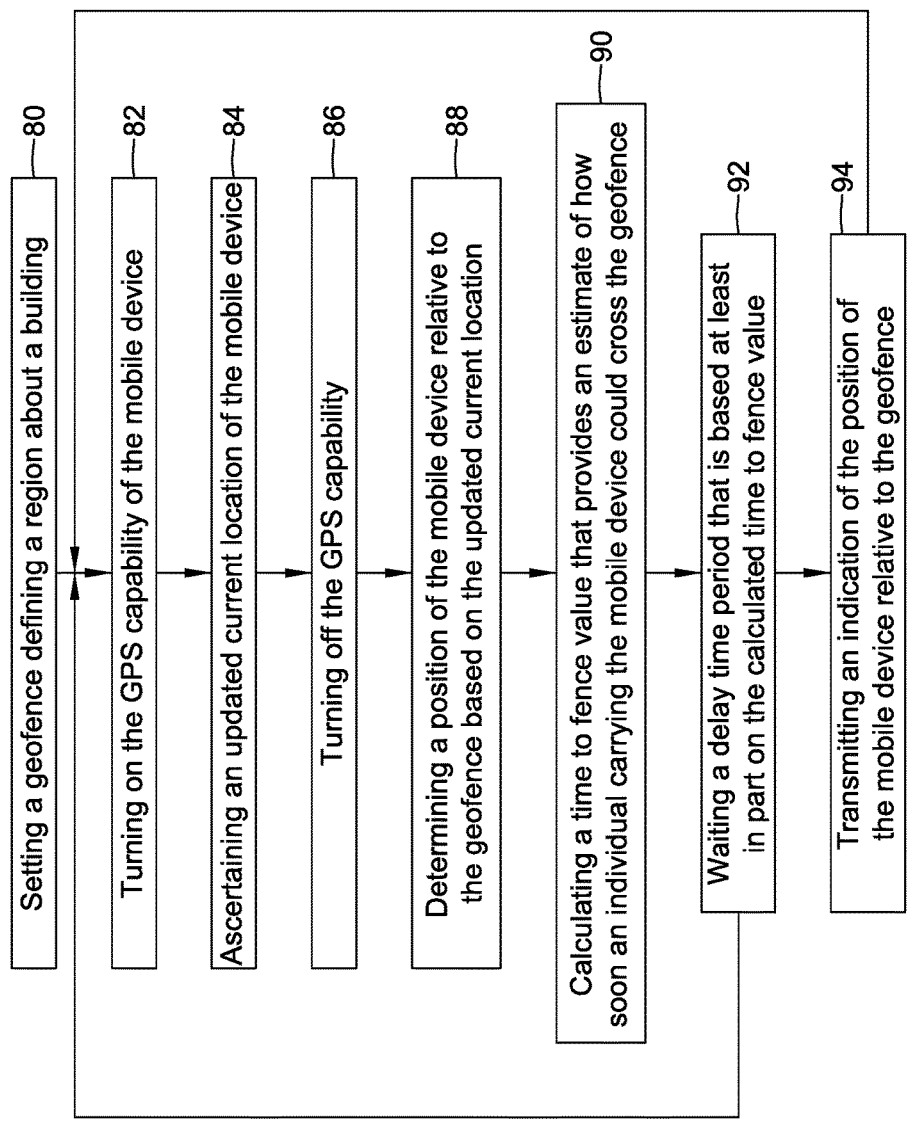
FIGS. 6 through 8 are flow diagrams showing illustrative methods that may be carried out in accordance with embodiments of the disclosure.

FIG. 6 is a flow diagram showing an illustrative method for implementing geofencing using a mobile device that has a GPS capability and that is configured to be operably coupled to a building controller. As shown at block 80, a geofence defining a region about a building may be set. The GPS capability of the mobile device may be turned on, as indicated at block 82. As seen at block 84, an updated current location of the mobile device may be ascertained via the GPS capability and then the GPS capability may be turned off as shown at block 86. A position of the mobile device relative to the geofence may be determined based on the updated current location, as generally indicated at block 88. As shown at block 90, a time to fence value that provides an estimate of how soon an individual carrying the mobile device could cross the geofence may be calculated.

In some instances, calculating the time to fence value includes estimating how soon the individual carrying the mobile device could cross the geofence when returning to the building. In some cases, calculating the time to fence value includes estimating how soon the individual carrying the mobile device could cross the geofence when leaving the building. Calculating the time to fence value may include determining a straight line distance between the updated current location of the individual carrying the mobile device and the building and subtracting a radius defining the geofence, and determining the time to fence value based on a predetermined maximum speed value (e.g. 80 mph). In some cases, calculating the time to fence value may include determining a straight line distance between the updated current location of the individual carrying the mobile device and the closest point on the geofence. In some cases, calculating the time to fence value may include determining a driving route between the updated current location of the individual carrying the mobile device and a point on the geofence along the driving route, and determining the time to fence value based on the driving route. These are just some examples.

The GPS may remain off for a delay time period that is based at least in part on the calculated time to fence value, as seen at block 92. In some cases, control may pass back to block 82, and the cycle may continue. In some cases, however, control may first pass from block 92 to block 94, where the mobile device transmits an indication of its position relative to the geofence. In some cases, the indication of the position of the mobile device relative to the geofence is transmitted when the updated current location of the mobile device crosses the geofence, and the indication of the position of the mobile device relative to the geofence indicates a geofence crossing.

Figure 7:
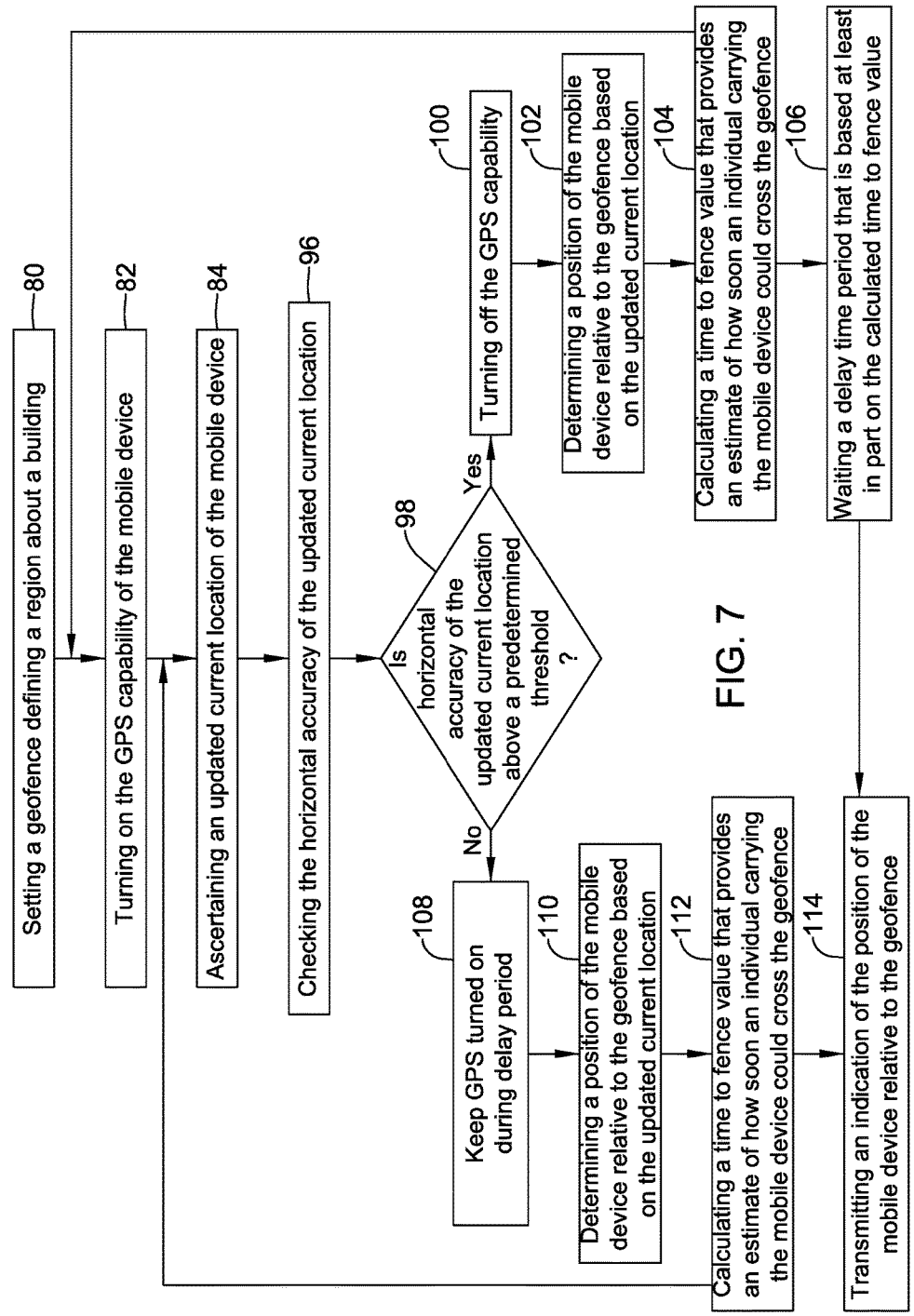

FIG. 7 is a flow diagram showing another illustrative method for implementing geofencing using a mobile device that has a GPS capability and that is configured to be operably coupled to a building controller. As shown at block 80, a geofence defining a region about a building may be set. The GPS capability of the mobile device may be turned on, as indicated at block 82. As seen at block 84, an updated current location of the mobile device may be ascertained.

The horizontal accuracy, or HDOP, of the current location may be checked as seen at block 96. As decision block 98, a determination is made as to whether the HDOP is above a predetermined threshold. If yes, control passes to block 100 and the GPS capability is turned off. A position of the mobile device relative to the geofence may be determined based on the updated current location, as generally indicated at block 102. As shown at block 104, a time to fence value that provides an estimate of how soon an individual carrying the mobile device could cross the geofence may then be calculated.

In some instances, calculating the time to fence value includes estimating how soon the individual carrying the mobile device could cross the geofence when returning to the building. In some cases, calculating the time to fence value includes estimating how soon the individual carrying the mobile device could cross the geofence when leaving the building. Calculating the time to fence value may include determining a straight line distance between the updated current location of the individual carrying the mobile device and the building and subtracting a radius defining the geofence, and determining the time to fence value based on a predetermined maximum speed value (e.g. 80 mph). In some cases, calculating the time to fence value may include determining a straight line distance between the updated current location of the individual carrying the mobile device and the closest point on the geofence. In some cases, calculating the time to fence value may include determining a driving route between the updated current location of the individual carrying the mobile device and a point on the geofence along the driving route, and determining the time to fence value based on the driving route. These are just some examples.

The GPS may remain off for a delay time period that is based at least in part on the calculated time to fence value, as seen at block 106. In some cases, control may pass back to block 82, and the cycle may continue. In some cases, however, control passes from block 106 to block 114, where the mobile device transmits an indication of its position relative to the geofence. In some cases, the indication of the position of the mobile device relative to the geofence is transmitted when the updated current location of the mobile device crosses the geofence, and the indication of the position of the mobile device relative to the geofence indicates a geofence crossing.

Returning back to decision block 98, if the HDOP is not above a predetermined threshold, control passes to block 108. Block 108 keeps the GPS on during the subsequent delay period in an attempt to get a more accurate reading on the current location. A position of the mobile device relative to the geofence may then be determined based on the updated current location, as generally indicated at block 110. As shown at block 112, a time to fence value that provides an estimate of how soon an individual carrying the mobile device could cross the geofence may be calculated. In some cases, control may pass back to block 84, and the cycle may continue. In some cases, however, control passes from block 112 to block 114, where the mobile device transmits an indication of its position relative to the geofence. In some cases, the indication of the position of the mobile device relative to the geofence is transmitted when the updated current location of the mobile device crosses the geofence, and the indication of the position of the mobile device relative to the geofence indicates a geofence crossing.

Figure 8:
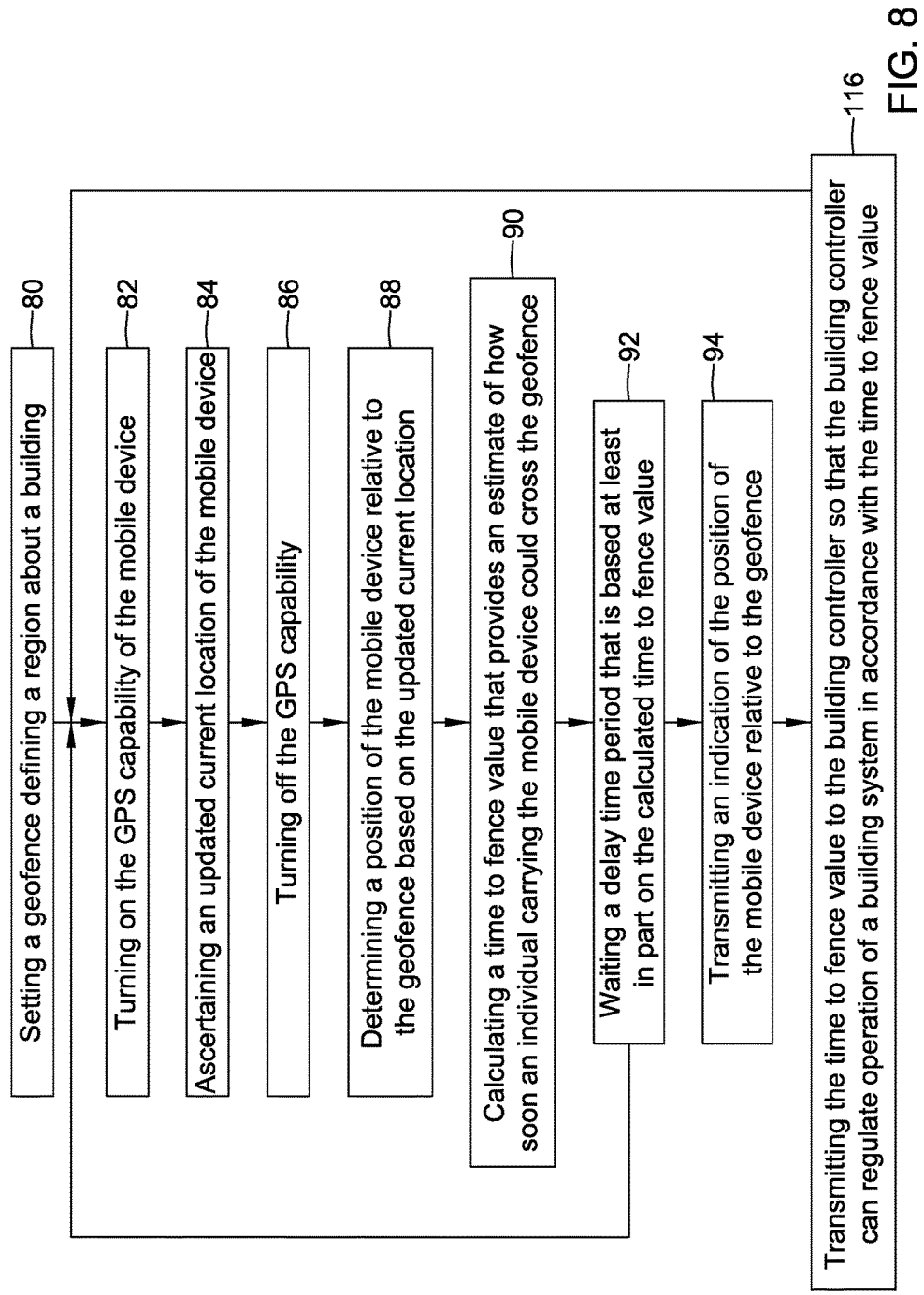

FIG. 8 is a flow diagram showing another illustrative method for implementing geofencing using a mobile device that has a GPS capability and that is configured to be operably coupled to a building controller. As shown at block 80, a geofence defining a region about a building may be set. The GPS capability of the mobile device may be turned on, as indicated at block 82. As seen at block 84, an updated current location of the mobile device may be ascertained via the GPS capability and then the GPS capability may be turned off as shown at block 86. A position of the mobile device relative to the geofence may be determined based on the updated current location, as generally indicated at block 88. As shown at block 90, a time to fence value that provides an estimate of how soon an individual carrying the mobile device could cross the geofence may be calculated.

In some instances, calculating the time to fence value includes estimating how soon the individual carrying the mobile device could cross the geofence when returning to the building. In some cases, calculating the time to fence value includes estimating how soon the individual carrying the mobile device could cross the geofence when leaving the building. Calculating the time to fence value may, for example, include determining a straight line distance between the updated current location of the individual carrying the mobile device and the building and subtracting a radius defining the geofence, and determining the time to fence value based on a predetermined maximum speed value (e.g. 80 mph). In some cases, calculating the time to fence value may include determining a straight line distance between the updated current location of the individual carrying the mobile device and the closest point on the geofence. In some cases, calculating the time to fence value may include determining a driving route between the updated current location of the individual carrying the mobile device and a point on the geofence along the driving route, and determining the time to fence value based on the driving route. These are just some examples.

The GPS may remain off for a delay time period that is based at least in part on the calculated time to fence value, as seen at block 92. In some cases, control may pass back to block 82, and the cycle may continue. In some cases, however, control may be passed from block 92 to block 94, where the mobile device transmits an indication of its position relative to the geofence. In some cases, the indication of the position of the mobile device relative to the geofence is transmitted when the updated current location of the mobile device crosses the geofence, and the indication of the position of the mobile device relative to the geofence indicates a geofence crossing. In some cases, the time to fence value may be transmitted to a building controller so that the building controller can regulate operation of a building system in accordance with the time to fence value as seen at block 116.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A mobile device comprising:
  a user interface;
  a memory for storing an executable program, the memory also storing information pertaining to a geofence assigned to a building;
  a communications module;
  location services including a lower power location capability that consumes power when activated and a higher power location capability that consumes more power than the lower power location capability when activated, each providing an updated current location of the mobile device when activated;
  a controller operably coupled to the user interface, the memory, the communications module, and the location services, the controller configured to:
    compare the updated current location provided by the location services to the geofence and determine when the mobile device has crossed the geofence indicating a geofence crossing event;
    upon determining a geofence crossing event, cause the mobile device to communicate the geofence crossing event to a building controller at least in part via the communications module of the mobile device so that the building controller can regulate operation of a building system in response to the geofence crossing event;
    when the mobile device is more than a threshold from the geofence, use the lower power location capability more often than the higher power location capability to provide the updated current location of the mobile device; and
    when the mobile device is less than the threshold from the geofence, use the higher power location capability to provide the updated current location of the mobile device.

2. The mobile device of claim 1, wherein the lower power location capability comprises a cellular triangulation capability.

3. The mobile device of claim 1, wherein the higher power location capability comprises a GPS capability.

4. The mobile device of claim 1, wherein the lower power location capability comprises a cellular triangulation capability and the higher power location capability comprises a GPS capability.

5. The mobile device of claim 1, wherein the threshold corresponds to a distance.

6. The mobile device of claim 1, wherein the threshold corresponds to a time.

7. The mobile device of claim 1, wherein the threshold corresponds to a predetermined TIME TO FENCE threshold, and the controller is configured to:
  use the updated current location of the mobile device to determine a TIME TO FENCE value, wherein the TIME TO FENCE value is an estimate of a minimum length of time that it would take for an individual carrying the mobile device to cross the geofence;
  use the lower power location capability of the mobile device more often than the higher power location capability when the determined TIME TO FENCE value is greater than the predetermined TIME TO FENCE threshold; and
  use the higher power location capability of the mobile device when the determined TIME TO FENCE value is less than the predetermined TIME TO FENCE threshold.

8. A non-transitory computer-readable storage medium with an executable program stored thereon, wherein the executable program is configured to instruct a mobile device, having a user interface with a display, a communications module, a memory, and location services including a lower power location capability that consumes power when activated and a higher power location capability that consumes more power than the lower power location capability when activated, each for providing an updated current location of the mobile device when activated, to perform the following:

comparing the updated current location provided by the location services to a geofence stored in the memory of the mobile device and determining when the mobile device has crossed the geofence indicating a geofence crossing event;

upon determining a geofence crossing event, causing the mobile device to communicate the geofence crossing event to a building controller at least in part via the communications module of the mobile device so that the building controller can regulate operation of a building system in response to the geofence crossing event; and when the mobile device is more than a threshold from the geofence, using the lower power location capability more often than the higher power location capability to provide the updated current location of the mobile device; and when the mobile device is less than the threshold from the geofence, using the higher power location capability more often than the lower power location capability to provide the updated current location of the mobile device.

9. The non-transitory computer-readable storage medium of claim 8, wherein the lower power location capability comprises a cellular triangulation capability.

10. The non-transitory computer-readable storage medium of claim 9, wherein the higher power location capability comprises a GPS capability.

11. The non-transitory computer-readable storage medium of claim 8, wherein when the mobile device is less than the threshold from the geofence, using the higher power location capability and not using the lower power location capability to provide the updated current location of the mobile device.

12. The non-transitory computer-readable storage medium of claim 8, wherein the threshold corresponds to a distance.

13. The non-transitory computer-readable storage medium of claim 8, wherein the threshold corresponds to a time.

14. The non-transitory computer-readable storage medium of claim 8, wherein the threshold corresponds to a predetermined TIME TO FENCE threshold, and the executable program is configured to instruct the mobile device to perform the following:

using the updated current location of the mobile device to determine a TIME TO FENCE value, wherein the TIME TO FENCE value is an estimate of a minimum length of time that it would take for an individual carrying the mobile device to cross the geofence;

using the lower power location capability of the mobile device more often than the higher power location capability when the determined TIME TO FENCE value is greater than the predetermined TIME TO FENCE threshold; and using the higher power location capability of the mobile device when the determined TIME TO FENCE value is less than the predetermined TIME TO FENCE threshold.

15. A method, comprising comparing an updated current location of a mobile device provided by a location services of the mobile device to a geofence stored by the mobile device, wherein the location services includes a lower power location capability that consumes power when activated and a higher power location capability that consumes more power than the lower power location capability when activated, and determining when the mobile device has crossed the geofence indicating a geofence crossing event;

upon determining a geofence crossing event, causing the mobile device to communicate the geofence crossing event to a building controller so that the building controller can regulate operation of a building system in response to the geofence crossing event;

when the mobile device is more than a threshold from the geofence, using the lower power location capability of the location services more often than the higher power location capability of the location services of the mobile device; and when the mobile device is less than the threshold from the geofence, using the higher power location capability to provide the updated current location of the mobile device.

16. The method of claim 15, wherein the lower power location capability comprises a cellular triangulation capability.

17. The method of claim 15, wherein the higher power location capability comprises a GPS capability.

18. The method of claim 15, wherein the lower power location capability comprises a cellular triangulation capability and the higher power location capability comprises a GPS capability.

19. The method of claim 15, wherein the threshold corresponds to a distance.

20. The method of claim 15, wherein the threshold corresponds to a predetermined TIME TO FENCE threshold, and the method further comprises:

using the updated current location of the mobile device to determine a TIME TO FENCE value, wherein the TIME TO FENCE value is an estimate of a minimum length of time that it would take for an individual carrying the mobile device to cross the geofence;

using the lower power location capability of the mobile device more often than the higher power location capability when the determined TIME TO FENCE value is greater than the predetermined TIME TO FENCE threshold; and using the higher power location capability to provide the updated current location of the mobile device when the determined TIME TO FENCE value is less than the predetermined TIME TO FENCE threshold.

* * * * *